F. I. DU PONT.
SYSTEM FOR STEAM DRIVEN MOTOR VEHICLES.
APPLICATION FILED JUNE 27, 1919.
1,386,608.
Patented Aug. 9, 1921.
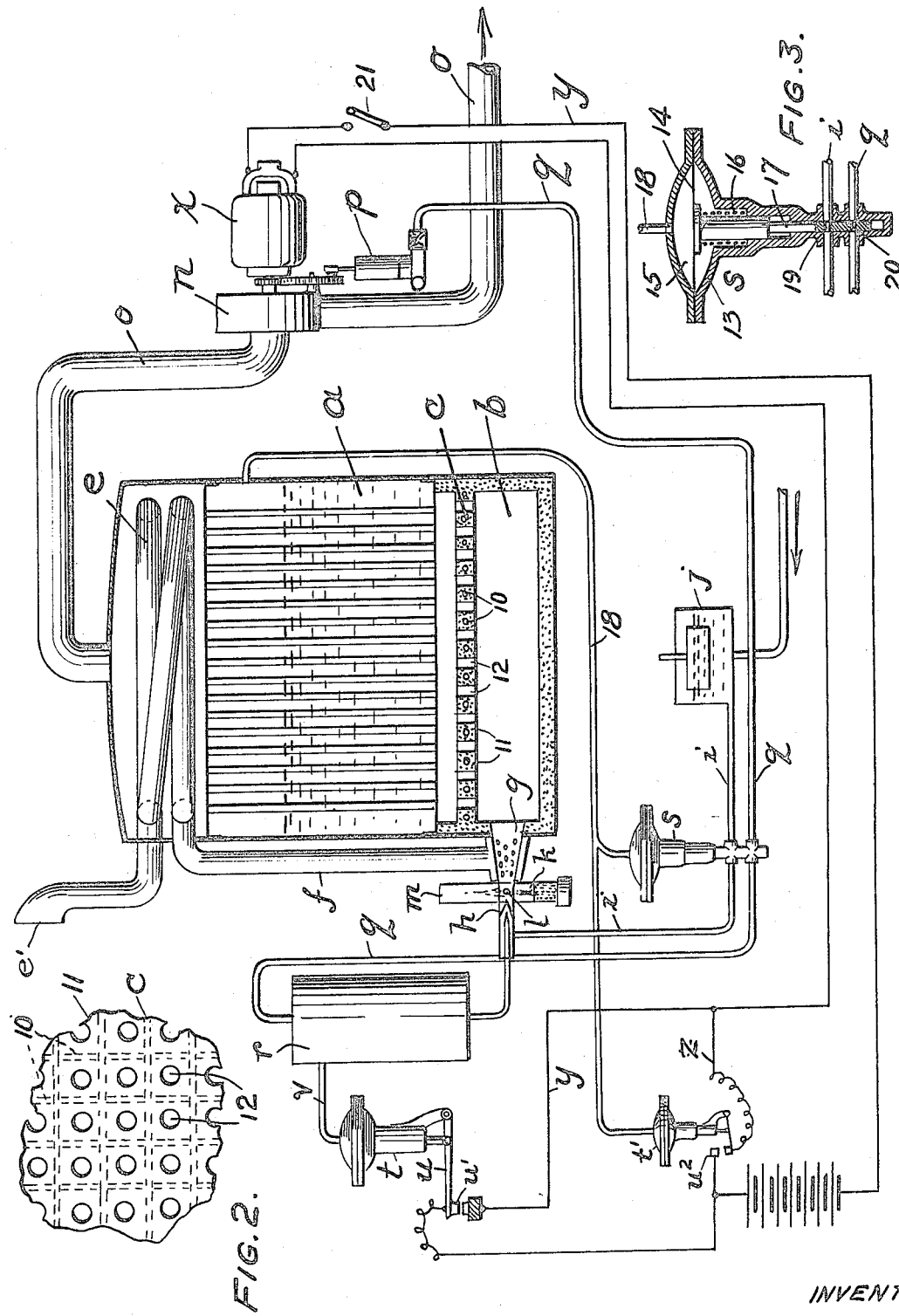
INVENTOR
Francis I. du Pont
BY Frank D. Busser
ATTORNEY
WITNESS:
Robt. R. Kitchel.

UNITED STATES PATENT OFFICE.

FRANCIS I. du PONT, OF WILMINGTON, DELAWARE, ASSIGNOR TO DELAWARE CHEMICAL ENGINEERING COMPANY, OF WILMINGTON, DELAWARE, A CORPORATION OF DELAWARE.

SYSTEM FOR STEAM-DRIVEN MOTOR-VEHICLES.

1,386,608.         Specification of Letters Patent.       Patented Aug. 9, 1921.

Application filed June 27, 1919. Serial No. 307,103.

*To all whom it may concern:*

Be it known that I, FRANCIS I. DU PONT, a citizen of the United States, residing at Wilmington, county of New Castle, and State of Delaware, have invented a new and useful Improvement in Systems for Steam-Driven Motor-Vehicles, of which the following is a full, clear, and exact description, reference being had to the accompanying drawings, which form a part of this specification.

The object of my invention is to provide an improved system for supplying air and liquid fuel to a steam boiler and for withdrawing the waste gases to the rear of the vehicle. The invention involves novel combinations and arrangements and has pronounced advantages. Among the more important advantages is the automatic cleansing of the combustion chamber and boiler flues from vapor, thereby preventing gas explosions and unpleasant odors. The invention, as well as its advantages, will be understood by a description of a preferred embodiment thereof, in connection with the accompanying drawings, in which—

Figure 1 is a diagram of the entire system.

Fig. 2 is a partial plan view of a grill over the combustion chamber.

Fig. 3 is a detail view, in vertical section, of the automatic valve.

$a$ is the boiler and $b$ the combustion chamber. The top wall of the combustion chamber is a grill $c$. The grill is composed of nickel rods 10 cast in mesh form in fire-proof cement 11, there being round holes 12 formed in the cement within the meshes of the nickel rods.

$e$ is an air pre-heating coil arranged above the boiler and arranged to be enveloped in the waste products of combustion from the combustion chamber after they have passed over the boiler flues. The coil $e$ has an air intake $e'$. After the air has passed through the coil $e$, and has become heated, it passes down, through a pipe $f$, into a mixing chamber. This mixing chamber comprises a cone $g$, preferably of nickel, having perforations. The cone is surrounded by a jacket having an annular space with which the end of pipe $f$ communicates. The heated air from pipe $f$ distributes itself and blows, through the holes in the cone, into the interior thereof.

$h$ is the fuel injector or spray jet. The injector is connected with a source of compressed air (hereinafter described) and, through a pipe $i$, with a float chamber $j$, which is connected with a main fuel reservoir not shown. A somewhat similar construction is shown in my Patent No. 1,290,132, dated January 7, 1919. The air entering the injector $h$ operates to lift the liquid fuel from the float chamber and discharge it into the narrow end of the cone $g$, wherein it is ignited in the manner now to be described.

$k$ is a lamp arranged under the narrow end of the cone $g$. The flame of the lamp, which acts as a pilot light, contacts with the cone and is sucked, through a small hole $l$, into the interior of the cone, where it ignites and maintains ignited the spray jet of liquid fuel. The burning fuel receives a constant accession of hot air through the holes in the cone, as above described, and the burning mixture thence passes out the wide mouth of the cone into the combustion chamber, where it heats the water in the boiler. The lamp $k$ has a chimney $m$, which prevents the flame being blown out by the wind.

A fan $n$ is interposed in the pipe $o$ that conducts the waste gases to the rear of the vehicle. The fan is operated by an electric motor $x$. The fan $n$ serves to determine the circulation of air in the entire system. Connected with the motor $x$ is a small air pump $p$ which, through a pipe $q$, supplies the air of about ten pounds pressure required for the spray jet $h$. The pipe $q$ connects with a compressed air tank $r$, which is connected with the spray jet.

As there is always, during the operation of the fan $n$, a slight suction on the entire system, the flame from the pilot light $k$ will with certainty be drawn through the hole $l$ into the interior of the cone $g$. When, however, the fan is not operating, the pilot light will simply burn in the ordinary manner, its combustion products escaping through the chimney $m$.

The system is regulated by a diaphragm valve $s$ shown in detail in Fig. 3. The structure comprises a body 13 supporting the diaphragm 14 and the valve seat, a steam chamber 15 back of the diaphragm, a spring 16 set to receive a definite steam pressure, and a valve rod 17 connected with the diaphragm. A pipe 18 connects the steam chamber 15 with the boiler. The valve rod 17 is interposed in the oil pipe $i$ and the air pipe $q$. A similar diaphragm valve is shown in my patent hereinbefore mentioned. In the present construction the valve rod is provided with two holes, 19 and 20, which are in alinement with pipes $i$ and $q$. When the boiler pressure rises above a predetermined maximum the valves 19 and 20 simultaneously close. The closing of valve 19 closes communication between the float reservoir $j$ and the injector $h$, thereby stopping the spray. The closing of valve 20 shuts off the air supply to the air reservoir $r$.

The pump $p$ is so constructed that its plunger has considerable clearance, so that when the pipe $q$ is closed by the valve 20 the pressure does not mount up above that which is predetermined by the ratio of the untraversed space in the pump cylinder to the whole stroke of the plunger. This arrangement precludes the necessity for having a safety valve on the pipe $q$.

Another diaphragm arrangement $t$, similar, so far as the diaphragm and spring are concerned, to the diaphragm valve $s$, operates a switch lever $u$. A pipe $v$ connects the chamber back of the diaphragm with the compressed air tank $r$. The switch lever $u$, through a contact $u'$, closes the electric circuit $y$ through a storage battery and the motor $x$. A shunt circuit $z$ is controlled by an automatic switch to be hereafter described.

The device $t$ operates to close, and hold closed, the switch $u$ as soon as the air in the reservoir $r$ reaches a certain pressure, which will be a pressure below the normal one of ten pounds. When, however, the pressure in reservoir $r$ drops below the pressure at which device $t$ operates to hold switch $u$ closed, switch $u$ opens, thus opening the circuit to the motor $x$; the purpose of which will be presently explained.

A device $t'$, similar to $t$ except that it works the switch in exactly the opposite way, is arranged to control the circuit $z$. The switch $u^2$ closes when the boiler pressure falls below a predetermined minimum, but is held open when the boiler pressure is normal.

To start the system, the pilot lamp $k$ is ignited. The switch 21 is then closed, thus closing the circuit through the motor $x$. This starts the motor, the fan $n$ and the air pump $p$. Bearing in mind that, there being no pressure in the boiler, valves 19 and 20 are open, air now starts to circulate through the entire system, and pressure starts to accumulate in the reservoir $r$. As soon as a little pressure accumulates in the reservoir $r$, the switch $u'$ closes and the circuit through the motor is kept closed even when the pressure in the boiler is such that the device $t'$ operates to hold open the switch $u^2$. The pressure in the reservoir $r$ continues to rise until the injector $h$ lifts the liquid fuel from the float chamber $j$. As soon as the liquid fuel is sprayed at the jet $h$ it is ignited, through the hole $l$, by means of the pilot light $k$. The spray being well supplied with air entering through the holes in the cone $g$ at a predetermined rate, a hot blue flame is produced in the combustion chamber and is distributed through the holes in the grill $c$, heating the boiler evenly and efficiently. When the pressure in the boiler reaches the point required to close the valves 19 and 20, the fuel supply is cut off from the injector $h$ and the air supply is cut off from the chamber $r$. The pressure in chamber $r$ now slowly drops, but remains sufficiently high to hold closed the switch $u$, and the motor $x$ and the fan $n$ continue to operate for a definite time after the shutting off of the fuel. This clears the combustion chamber and flues of gas, thus preventing the possibility of a gas explosion and preventing, also, unpleasant odors due to the products of incomplete combustion of fuel.

In the normal operation of the system, when the boiler pressure falls to the point predetermined for the minimum, the device $t'$ serves to start the motor $x$ even though sufficient time has elapsed to permit the evacuation of the chamber $r$ to the point where the motor has been stopped by the opening of the switch $u$.

Having now fully described my invention, what I claim and desire to protect by Letters Patent is:

1. In a system for steam driven motor vehicles, the combination with the boiler and the combustion chamber, of means to supply a fuel mixture to the combustion chamber, a pilot light for igniting the mixture, means to start the supply of the fuel mixture, means governed by the pressure of steam in the boiler to shut off the supply of fuel mixture, and means to create a forcible draft through the combustion chamber and flues and cleanse them of gas after the supply of fuel mixture is shut off.

2. In a system for steam driven motor vehicles, the combination with the boiler and the combustion chamber, of means to establish a forcible circulation through and away from the combustion chamber, means to supply a fuel mixture to the combustion chamber, a pilot light for igniting the mixture, means to start said circulation and said supply of fuel mixture, means governed by the pressure of steam in the boiler to first arrest the supply of fuel mixture and subsequently stop said circulation, thereby, in the interval, cleaning the combustion chamber and flues of gas.

3. In a system for steam driven motor vehices, the combination with the boiler and the combustion chamber, of an injector, a liquid fuel supply connected with the injector, means to supply compressed air to the injector and thereby feed fuel thereto, means governed by the pressure of steam in the boiler to cut off the supply of fuel, an air intake to the combustion chamber, and suction means to withdraw gas from the combustion chamber and boiler flues operable while fuel is being supplied and after the supply of fuel is shut off.

4. In a system for steam driven motor vehicles, the combination with the boiler and the combustion chamber, of an injector, a liquid fuel supply connected with the injector, a compressed air reservoir connected with the injector, means to supply compressed air to the reservoir, means governed by the pressure of steam in the boiler to cut off the supply of compressed air to the reservoir, a suction device to withdraw gas from the combustion chamber and the boiler flues, means to actuate the suction device and air compression means, means to control the starting of the suction device and air compression means, and an automatic device controlled by the compressed air in the reservoir and adapted to maintain in operation the suction device operating means after the supply of air to the reservoir is cut off.

5. In a system for steam driven motor vehicles, the combination with the boiler and the combustion chamber, of an injector, a liquid fuel supply connected with the injector, a compressed air reservoir connected with the injector, means to supply compressed air to the reservoir, means governed by the pressure of steam in the boiler to cut off the supply of fuel to the injector and the supply of compressed air to the reservoir, a suction device to withdraw gas from the combustion chamber and boiler flues, means to actuate the suction device and air compression means, means to control the starting of the suction device and air compression means, and an automatic device controlled by the compressed air in the reservoir and adapted to maintain in operation the suction device operating means after the supply of fuel to the injector and air to the reservoir is cut off.

6. In a system for steam driven motor vehicles, the combination with the boiler and the combustion chamber, of means to supply thereto air under pressure and liquid fuel and accumulate a supply of compressed air in the system, a pilot light to ignite the mixture of air and fuel, a suction device to withdraw the products of combustion from the combustion chamber, means to actuate the suction device, automatic means controlled by pressure of steam in the boiler to shut off the supply of fuel and compressed air, and automatic means controlled by the accumulated supply of compressed air in the system to maintain in operation the suction device operating means after the supply of compressed air and fuel is shut off and to render the suction device operating means inoperative when the pressure of air in the system falls to a predetermined point.

7. In a system for steam driven motor vehicles, the combination with the boiler and combustion chamber, of an air intake to the combustion chamber, an injector, a liquid fuel supply connected with the injector, means to supply air under pressure to draw the fuel to the injector, a pilot light to ignite the mixture of air and fuel, a suction device to withdraw products of combustion from the combustion chamber, a source of electric current supply, and means operable by the electric current to actuate the suction device and the compressed air supply means.

8. In a system for steam driven motor vehicles, the combination with the boiler and combustion chamber, of an air intake to the combustion chamber, an injector, a liquid fuel supply connected with the injector, means to supply air under pressure to draw the fuel to the injector, a pilot light to ignite the mixture of air and fuel, a suction device to withdraw products of combustion from the combustion chamber, a source of electric current supply, means operable by the electric current to actuate the compressed air supply means and the suction device, and means operable by the rise of steam pressure in the boiler to cut off the supply of the air and fuel mixture to the injector until said steam pressure drops to a predetermined point.

9. In a system for steam driven motor vehicles, the combination with the boiler and combustion chamber, of an air intake to the combustion chamber, an injector, a liquid fuel supply connected with the injector, a compressed air reservoir, an air pump to supply air under pressure to the air reservoir, a connection between the air reservoir and the injector, a pilot light to ignite the mixture of air and fuel, a suction device to withdraw products of combustion from the combustion chamber, a source of electric current supply, a motor operable by the electric current to actuate the suction device, means controlled by the pressure of steam in the boiler to cut off the fuel supply and the supply of air to the reservoir, and means controlled by the pressure of air in the air reservoir to open the electric circuit to the motor.

10. In a system for steam driven motor vehicles, the combination with the boiler and the combustion chamber, of a fuel and air mixing chamber discharging into the combustion chamber, a pilot light at the front of the mixing chamber, a chimney for the lamp encircling the chamber, there being flame openings through the wall of the mixing chamber opening into the chimney, an air intake communicating with the mixing chamber between its discharge and the pilot light, an injector in front of the mixing chamber and pilot light, and means to supply liquid fuel and air under pressure to the injector.

11. In a system for steam driven motor vehicles, the combination with the boiler and the combustion chamber, of an injector, a fuel supply connected with the injector, an air reservoir, a connection from the reservoir to supply air under pressure to the injector, an air supply leading to the air reservoir, two valves controlling respectively the fuel supply and the compressed air supply to the reservoir, and means controlled by the pressure of steam in the boiler to actuate said valves.

12. In a system for steam driven motor vehicles, the combination with a steam generator, a mixing chamber provided with an air inlet, of means to spray liquid fuel into the mixing chamber, a combustion chamber for the generator communicating with the mixing chamber and in which the combustible mixture of air and fuel is consumed, an offtake for the products of combustion beyond the generator, and means in the offtake to preheat air from the waste heat in the outgoing products of combustion from the combustion chamber and convey it into the mixing chamber through said air inlet.

13. In a system for steam driven motor vehicles, the combination with the boiler and the combustion chamber, of an injector, a liquid fuel supply connected with the injector, a source of pressure fluid connected with the injector, said fluid adapted to draw the fuel to the injector and form an ignitible fuel mixture jet, and means to preheat air from the waste heat in the products of combustion outgoing from the combustion chamber and bring air so heated into admixture with the ignited fuel mixture jet.

14. In a system for steam driven motor vehicles, the combination with the boiler and the combustion chamber, of a fuel supply and a compressed air reservoir, connections therefrom to the combustion chamber, means to ignite the mixture of air and fuel, a suction device to withdraw products of combustion from the combustion chamber, means to supply compressed air to the air reservoir, a source of electric current supply, means operable by the electric circuit to operate the suction device, means controlled by the pressure of steam in the boiler to cut off the air supply to the reservoir, an automatic switch in the circuit, means controlled by the pressure of air in the reservoir to operate the automatic switch, and a switch operable to close the circuit when the automatic switch is open.

15. In a system for steam driven motor vehicles, the combination with a boiler and the combustion chamber, of a fuel supply and a compressed air reservoir, connections therefrom to the combustion chamber, means to ignite the mixture of air and fuel, a suction device to withdraw products of combustion from the combustion chamber, means to supply compressed air to the air reservoir, a source of electric current supply, means operable by the electric circuit to operate the suction device, means operable by the rise of pressure in the boiler to cut off the air supply to the air reservoir, and two automatic switches in the circuit, one of said switches being operable by the recession of pressure in the air reservoir to open the circuit and the other operable by recession of boiler pressure to close the circuit.

16. In a system for steam driven motor vehicles, the combination with the boiler and the combustion chamber, of an injector, a liquid fuel supply connected with the injector, a compressed air reservoir connected with the injector, means to supply compressed air to the reservoir, means governed by the pressure of steam in the boiler to cut off the supply of compressed air to the reservoir, a suction device to withdraw gas from the combustion chamber and the boiler flues, means to actuate the suction device and air compression means, an automatic device controlled by the compressed air in the reservoir and adapted to maintain in operation for a time the suction device actuating means after the supply to the reservoir is shut off, and an automatic device operable in the recession of the pressure in the boiler to restart the suction device actuating means.

17. In a system for steam driven motor vehicles, the combination with the boiler and the combustion chamber, of an injector, a liquid fuel supply connected with the injector, a compressed air reservoir connected with the injector, means to supply compressed air to the reservoir, means governed by the pressure of steam in the boiler to cut off the supply of fuel to the injector and the supply of compressed air to the reservoir, a suction device to withdraw gas from the combustion chamber and boiler flues, means to actuate the suction device and air compression means, an automatic device controlled by the compressed air in the reservoir and adapted to maintain in operation for a time the suction device actuating means after the supply of fuel to the injector and air to the reservoir is cut off, and an automatic device operable in the recession of the pressure in the boiler to restart the suction device actuating means.

18. In a system for steam driven motor vehicles, the combination with the combustion chamber and boiler, of an injector, a fuel supply connected with the injector, means to supply pressure fluid to the injector and thus draw the fuel thereto and form an ignitible fuel mixture jet, a mixing chamber between the injector and the combustion chamber, and means to preheat air from the waste heat in the products of combustion outgoing from the combustion chamber and bring such preheated air into the mixing chamber.

19. In a system for steam driven motor vehicles, the combination with the combustion chamber and boiler, of an injector, a fuel supply connected with the injector, means to supply pressure fluid to the injector and thus draw the fuel thereto and form an ignitible fuel mixture jet, means governed by the boiler pressure to shut off the supply of fuel to the injector, a container communicating with the atmosphere and arranged to allow the air therein to absorb waste heat from the products of combustion outgoing from the combustion chamber, and means to establish a forcible circulation through said container and combustion chamber and boiler flues and bring such preheated air into admixture with the ignited fuel mixture jet and thence into the combustion chamber and also to cleanse the combustion chamber and flues of gas when the supply of fuel is shut off.

In testimony of which invention, I have hereunto set my hand, at Philada., Penna., on this 17th day of June, 1919.

FRANCIS I. du PONT.